Figure 1:
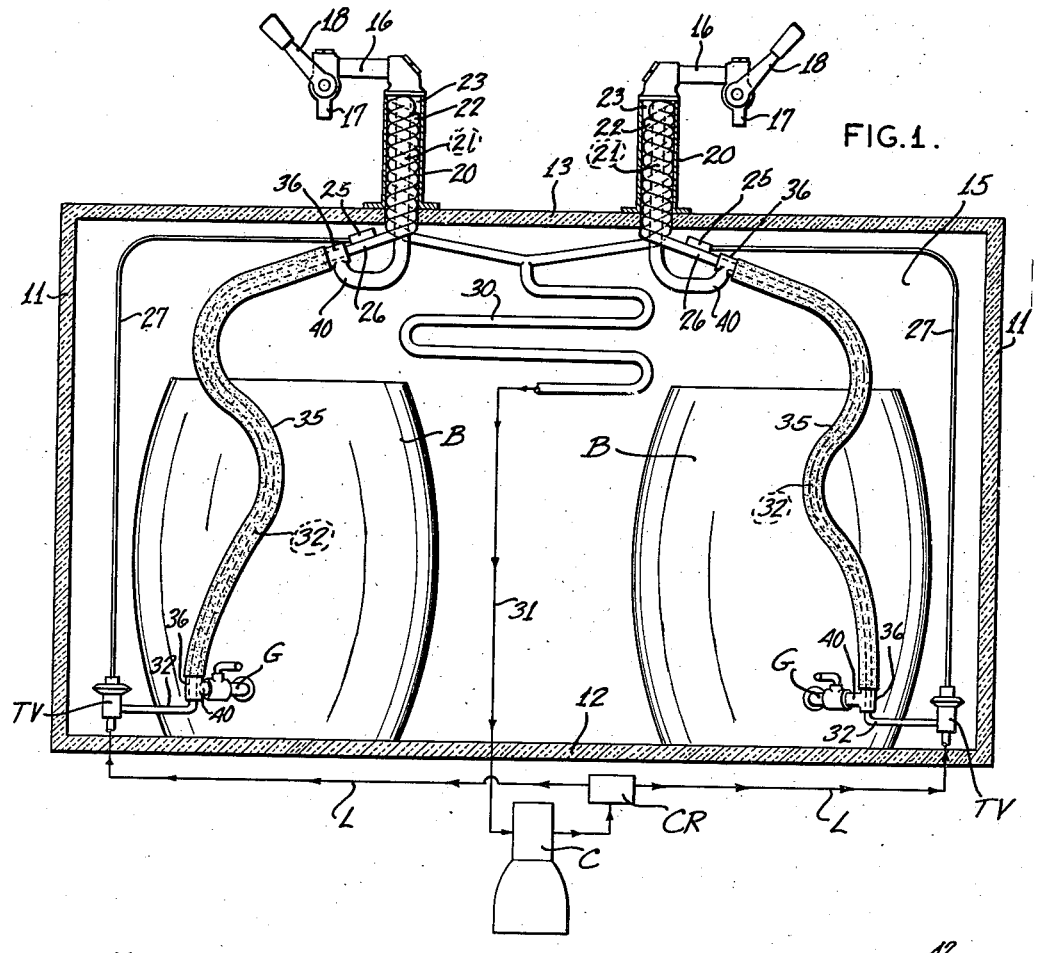

April 13, 1943.    L. WEISS    2,316,376

CHILLING MEANS FOR DRAFT BEVERAGES

Filed April 28, 1941

INVENTOR
LOUIS WEISS
BY Robert B. Terry
ATTORNEY

Patented Apr. 13, 1943

2,316,376

UNITED STATES PATENT OFFICE 2,316,376

CHILLING MEANS FOR DRAFT BEVERAGES

Louis Weiss, St. Louis, Mo.

Application April 28, 1941, Serial No. 390,665

5 Claims. (Cl. 62—141)

This invention relates to improvements in chilling means for draft beverages, and more particularly to an arrangement for more quickly chilling a draft beverage from within a tubular column thereof, as in a conduit between a supply container and dispensing faucet.

Numerous arrangements have heretofore been evolved for obviating the difficulties attending the service of draft beverages, such as carbonated liquids, draft beer, etc. For example, an unsatisfactory condition usually existed incident to the introduction of a fresh warm supply container into the system since the beverage drawn thereafter was apt to be too warm. A similar trouble occasionally otherwise was presented, as when the beer or like beverage remained in the draft line for a protracted period, and particularly in the zone near the dispensing faucet, it was apt to become too warm to meet the requirements of the trade.

The more usual arrangement for the cooling of draft beverages is to pass the liquid through a sinuous coil which is either wet-or-dry-cooled, indirectly from a source of cooling fluid, such as the evaporator portions of a mechanical refrigerator system. Still other arrangements have been proposed wherein only a relatively shorter section of draft line is employed between the supply barrel and dispensing tap. All such arrangements have, however, presented a number of difficulties in inadequacies of cooling. In the long sinuous coil arrangement, there exists a notable difficulty of proper regulation, resulting in wide variations in temperature of the beverage as served. In the heretofore prevailing arrangements utilizing a short chilled draft tube section, difficulty is experienced in drawing the beverage from a warm container, particularly in realizing only an inadequate rate of cooling of the relatively warm beverage when passed through a short chilled line. The present invention accordingly has, as its primary objective, an arrangement for stabilizing the temperature of the beverage as drawn from the faucet, irrespective of whether the supply container is chilled, as by secondary cooling expedients, or whether the supply of beverage, due say to recent replacement of a barrel thereof, is at a relatively high temperature.

Another important object of the invention, related to the foregoing, is attained in an arrangement utilizing for example, mechanical refrigeration under usual commercial operating conditions, and yet which markedly enhances the rate of cooling of the draft beverage, even from a relatively warm supply.

Yet another object of the invention, akin to those heretofore stated, is attained in an improved and positive control of primary cooling effect, in direct response to temperature conditions prevailing in a zone near the draft faucet.

Still another important object of the invention is attained in an arrangement such that a serving of beverage or part thereof, near or in the discharge end of the draft line, is always kept in a chilled condition ready to be drawn, thus obviating the loss of beverage, as is sometimes entailed, by warming effects thereof by the atmosphere outside of a cabinet or other enclosure, and in a zone where the draft line extends through and is subject to the outside air; the combination of present improvements including improved means for quick chilling throughout the draft line, and particularly ahead of its discharge terminus.

More explicitly stated with reference to the presently preferred embodiment, a still further object of the invention is realized in an improved draft conduit section so constructed as to convey and simultaneously to chill at a rapid rate, a column of the draft beverage which is of tubular form or annular section, presenting at a given time to a cooling medium, only a relatively thin film or wall of the beverage.

An additional object of the invention is attained in an improved combination of primary and secondary means for cooling the draft beverage in the draft line, such means being in counterflow relation to the flow of beverage, together with still another cooling means operative by maintaining a chilled atmosphere about the beverage supply container.

Figure 2:
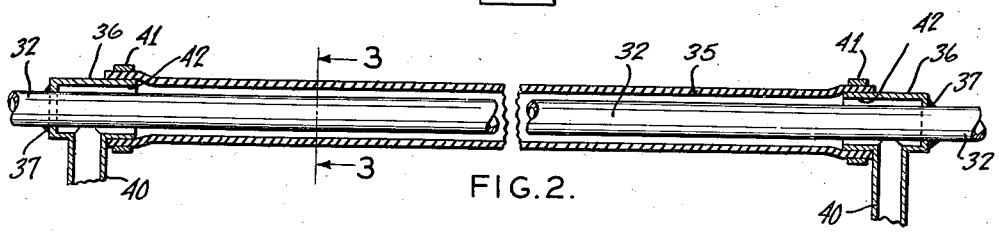
Figure 3:
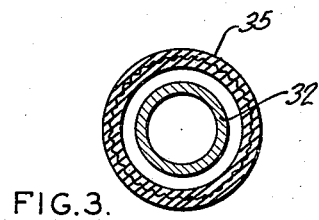

The foregoing and numerous other objects will more clearly appear from the following detailed description of a presently preferred embodiment of the invention, when considered in connection with the accompanying drawing, in which:

Fig. 1 is a vertical sectional elevation, partly diagrammatic in nature, showing a preferred assembly arrangement of parts constituting the beverage dispensing and cooling system in embodiment of the present invention; Fig. 2 is a sectional elevation, the sectional portions of which are taken in a plane including the axis of the draft tube or conduit partly characterizing the present invention, and Fig. 3 is a transverse sectional elevation, somewhat enlarged for clearness, and as taken along line 3—3 of Fig. 2.

Referring now by characters of reference to the drawing, it is preferred that the arrangement be embodied in assembly in a draft cabinet, the specific shape or form of which is not material to the principles of the invention, one example of a suitable cabinet being illustrated generally by the structure including end walls 11, a bottom 12, and a top 13. The cabinet is or may be constructed of usual materials, but is preferably characterized by either an insulating lining or constructed of materials having inherent insulating properties.

Disposed within the cabinet space which may be generally indicated by the numeral 15, is a supply barrel or a plurality thereof, each indicated at B, and each of which is provided, for example, with a standard tap fitting, which is exemplified by the Golden Gate fitting G.

The top surface of the element 13 of the cabinet constitutes a serving surface or plurality thereof, each of which is supplied, in the form illustrated, by one of the draft faucets or taps 16, the outlet of each of which is indicated at 17, and controlled by a valve (not shown) the actuating handle for which is indicated at 18.

By great preference, although the faucet proper is or may be of conventional form, the faucet body is of a considerably enlarged hollow construction comprising a vertical, preferably cylindrical shell 20. Within the shell 20 extends coaxially a somewhat enlarged draft tube portion 21, which is the terminal portion of the draft line, just ahead of the faucet. Spirally and closely wrapped about the terminal section 21 of the draft line, is a convolute portion 22 which constitutes a part of a refrigerant circulating line, the other parts of which and the source of supply thereto, will be hereinafter described. The closely wrapped spiral portion 22, the casing 20 and the relation thereof with the terminal draft line portion 21 may all be identical with or generally similar to the arrangement of parts more fully disclosed and claimed, of themselves and in combination, in my copending application Serial No. 373,251, filed January 6, 1941, and entitled "Draft assemblies for chilled beverages." Accordingly these portions will require no further detailed description, except to note that the space 23 within each of casings 20 and which is not occupied either by the draft line or coil 22 therein, is completely filled with a highly conductive or heat-transfer medium to facilitate the interchange of heat between the draft line 21 and coil 22, it being noted that the arrangement thus described serves to maintain in the terminal portion of the draft line, a chilled serving of beverage at all times in a zone immediately adjacent the faucet or tap. This arrangement obviates the condition sometimes prevailing during the period of infrequent service wherein the beverage near the faucet is, but for the improvements noted, apt to become warmed from room air to a degree that the first-drawn portion of the draft beverage is not sufficiently chilled to meet the expectation of the trade.

Proceeding now to a brief description of the remaining portions of the cooling fluid source and circulating line, since the cooling medium may conveniently consist of any of the conventional or otherwise suitable fluids employed in mechanical refrigeration systems, and since the latter may also be conventional as to system, it is thought sufficient to note that the refrigerant is supplied by a compressor C, suitably power-driven, and that the high side of the system communicates with or includes a condenser-receiver unit or the like CR, whence the refrigerant proceeds through the line or lines diagrammatically indicated at L, and thence to the supply connection of each of the thermostatic expansion valves TV. Any one of a number of suitable types of expansion valves may be employed, but it is a preference that these valves be of bulb-regulated type, the thermostatic elements of which include a bulb 25 or a plurality thereof. If more than one such control is utilized, each of the bulbs 25 is secured and hence thermally responsive to a portion of the cooling fluid line 26 which is just ahead of the chilled terminal portion of the draft line, and just beyond the initial or primary cooling portion of the draft line, as will later appear. Suitable control tube connections 27 are provided between the bulbs 25 and valves TV. The zone of primary cooling of the draft beverage will be hereinafter more fully described, and a provision for secondary or cabinet cooling as for gradually bringing down the temperature of the beverage in barrel B, is indicated by the sinuous coil 30 which may be disposed in suitable length and arrangement in the upper portion of or elsewhere within the cabinet space 15. A return or suction line 31, is directed back to the compressor C to close the refrigeration circuit.

Referring now more in detail to the arrangement selected for illustrating a preferred embodiment of the primary cooling arrangement intimately associated with the major portion of the draft line, it will be noted that this is formed of two concentric lengths of conduit or tubing, the inner of which is preferably formed of a semi-flexible, thin-wall metal tubing of a relatively small diameter, and which is indicated at 32, being the portion of the high side of the circulating line for cooling fluid, which connects the valve TV with the zone 26 just ahead of the spiral or convolutely wrapped portion of the cooling fluid line about the terminal portion 21 of the draft line.

Closely surrounding the tube 32 in coaxial or concentric relation, is a length of flexible tubing 35 which constitutes the major part of the length of the draft line as a whole, between the fitting G and the tap or faucet associated with the fixture 16. It will be noted that these concentric portions of the tube 32 and of the draft line 35 thereabout extend substantially straight from the barrel tap G to the upper portion of the cabinet. This relation is clearly preferred, and is to be understood to denote that the connection from barrel to the tap fitting is of non-sinuous form, being as direct as possible to meet all usual requirements by reason of slightly different locations of the barrel or barrels B, within the cabinet. It is also noted as highly desirable, for several reasons hereinafter detailed, that the dual conduit portions of tube 32 and 35 be of a restricted capacity. Principal among the reasons for this is to provide as direct a connection from barrel to faucet as possible, and to cool the beverage in the line 35, at as high a rate as possible, rather than to depend upon the more usual larger heat-absorbing surface of a sinuous arrangement of refrigerant tubing.

The beverage supply connection to the line 35 is effected as through an angle fitting indicated generally at 36, the straight portion of which is soldered or otherwise metallically united to the line 32, as at 37, the angle connection 40 being directed into the fitting G. At the opposite end of the concentric tube assembly, is a similar fitting 36 similarly soldered or secured as at 37 to the tube 32 and also provided with an angle connection 40. The connection 40 at the upper or remote end of the dual conduit section, is directly connected to the vertical or riser portion 21 of the draft line, being the terminal portion thereof heretofore described as closely embraced by the helical cooling coil 22 within the casing 20.

By great preference the outermost of the dual concentric tubing elements, being that indicated at 35, is of a flexible construction similar to that of certain types of beer hose currently available to the trade, and by further preference is of a synthetic rubber or rubber-like material, for example, the conduit material sold under the trade name of "Koroseal." The tube may be of a combination fabric and synthetic rubber construction, and the element 35 when so formed, possesses high inherent insulating properties; it is tasteless, and is not acted upon in any noticeable or harmful degree over a substantial period of usage, by carbonated beverages. Securement of the flexible insulating tube element 35 in assembly, may be effected by end clamp members such as 41, which serve to constrict the ends of the Koroseal tube in fluid-tight relation about the annular shoulder 42 on each of the respective angle fittings 36.

It is greatly preferred that whatever may be the selected diameters of tubes 32 and 35, the radial space between the outer wall of tube 32 and the inner wall of tube 35, be maintained at a minimum. In practice and successful commercial usage, a tinned copper tube of three-eighths inch outside diameter, and a Koroseal tube such as 35, having an inner diameter of one-half inch, have proven highly satisfactory. This provides a radial spacing of one-sixteenth inch, representing the thickness of beverage film conducted between the two tubes. Quick chilling of the beverage between the barrel and faucet is dependent upon a minimum thickness of film in these zones. While a spacing of the order of one-sixteenth inch is preferred, the arrangement is also satisfactorily operable, under most conditions, with a spacing between the tubes, hence a radial depth or thickness of film of the beverage, of the order of one-eighth inch. The minimum spacing as noted between inside and outside conduit sections, enables, even under conditions of high ambient temperature, continuously drawing even a quite warm beverage from the barrels B, in favorably chilled condition from the faucet. It is also a preference that irrespective of the radial spacing between the inner and outer tubing elements of the double conduit assembly, the beverage capacity of this portion of the line be not in excess of five to seven fluid ounces. Eight ounces may be mentioned as a desirable maximum. It has been found that a length of draft line of the order of twelve feet or something less, between the fitting G and faucet, results in a line capacity of the order stated.

During periods of relatively infrequent custom, during which the beverage may stand in the line, the terminal portion thereof is more apt to become warm, and but for present improvements, to result in initially drawing an appreciable volume of beverage too warm for the customer's satisfaction. This formerly prevailing difficulty is more than adequately cared for by the convolute or spirally wrapped portion 23 of the cooling fluid conduit, as heretofore described.

It is of course within the purview of the invention to circulate the beverage within the innermost tubing of the dual conduit assembly, and the refrigerant in the outer tube, but it is preferred, as illustrated and described, to circulate the draft beverage to be chilled, in the outermost conduit so that it traverses the major portion of the draft line in the form of a column of annular section, or thin annular film. The latter arrangement makes for quicker chilling, and the flexibility of the assembly of dual tubing elements is enhanced by making the outer or larger thereof of the more flexible material. The arrangement also has the further advantage in that the Koroseal or similar material forming the outer tubing, possesses high inherent insulating properties which prevents undesirable heat losses from the paired tubing elements through the major part of the length of the dual lines. The arrangement principally described and preferred, also has the advantage of minimizing hazards, shutdowns and dangerous contamination of the draft fluid line with refrigerant, as in the event of tube breakage, in comparison with the arrangement prevailing were the two tubes 32 and 35 reversed in relation and usage.

A further point of novelty will appear from the relation of the different cooling sections of the evaporator portions of the refrigerating system in relation to each other and in relation to the course of draft beverage. It will have been noted that the coldest refrigerant is first brought into heat-exchange relation with the warmest portion of the draft beverage in the line, namely, in a zone adjacent the fitting G, and that there is thus, in effect, established a counterflow relation between refrigerant and draft beverage, over the major portion of the length of the draft line as a whole.

It will have further appeared as a preference that the different sections of the evaporator portions of the tubing be arranged in series, in the high side of the refrigerating circuit, namely, the first such section being that which traverses the major portion of the length of beverage draft line, while a second somewhat warmer portion is identified with the wrapped or spiralled section 22, extending into the body of the draft fitting or faucet and embracing the terminal portion of the draft line. The refrigerant, after traversing the portions 32 and 22, is thence directed into the sinuous cabinet-cooling coil 30, as a third series-related section of the evaporator of the system, and thence is directed through the suction line or return 31, to the compressor C.

It will have appeared that the described arrangement, as has been frequently proven in both experimental and commercial experience, serves more than adequately to attain each of the several objects hereinabove set forth, as well as numerous others implied from the more detailed description of parts and their arrangement.

Although the invention has been described by making specific reference to a preferred embodiment of the invention, the detail of description is to be understood in an illustrative and not in a limiting sense, many changes being possible within the scope of the invention as defined by the claims hereunto appended.

I claim as my invention:

1. In a cooling assembly for draft beverages, a supply container, a draft line, a faucet from which the beverage is dispensed, a source of and a circulating line for a cooling fluid, said cooling fluid circulating line including a substantially direct portion consisting of a thin wall semi-flexible metal tube of relatively small diameter, the draft line including a portion coextensive with the last said portion of the circulating line and surrounding the latter in spaced relation, the last said portion of the draft line consisting of a tube of a non-metallic, flexible and tasteless material, and means including a terminal portion of the draft line and a further portion of the circulating line wrapped about said terminal portion, for keeping in chilled condition, a serving of beverage immediately adjacent the faucet.

2. In a cooling cabinet for dispensing draft beverages, a beverage supply container in the cabinet, a draft line directed from said supply container, a faucet on the cabinet, from which the beverage is dispensed, and connected to the draft line, a source of and a circulating line for a cooling fluid, said cooling fluid circulating line and said draft line each including a portion extending substantially directly from a zone near the supply container to a zone near the faucet, said portions between said zones including a thin wall semi-flexible metal tube as a part of the circulating line, a draft line portion surrounding said metal tube in spaced relation and being of a non-metallic flexible material having marked thermal insulating properties, a coil within the cabinet for cooling the space therein and about the supply container, and constituting a portion of the circulating line for the cooling fluid, said circulating line further including a spirally wrapped portion closely surrounding a terminal part of the draft line close to the faucet, for keeping in chilled condition, a serving of beverage immediately available at the faucet.

3. In a cooling assembly for draft beverages including an enclosure such as a cabinet, a supply container therein, a faucet from which the beverage is dispensed, a draft line from the supply container to the faucet, a source of and a circulating line for a cooling fluid, said line including a cooling coil in and for the enclosure as a secondary means for maintaining the temperature of the beverage, the circulating line including an arrangement, in series, in the order named, a first cooling section extending through a major portion of the draft line, a second cooling section wrapped closely about the terminal part of the draft line near the faucet, and a third portion consisting of said coil for cooling the enclosure.

4. In a cooling assembly for draft beverages including an enclosure such as a cabinet, a supply container therein, a faucet from which the beverage is dispensed, a draft line from the supply container to the faucet, a source of and a circulating line for a cooling fluid, the circulating line including an arrangement, in series, in the order named, a first cooling section extending through a major portion of the draft line, and having a supply connection near the draft line connection to the supply container, a second cooling section extending closely externally about the terminal part of the draft line near the faucet, and thermostatically controlled cooling-fluid-regulating means in the cooling fluid circulating line ahead of said first cooling section, and thermostatically responsive to temperature conditions in a zone substantially between said first and second cooling sections.

5. In an assembly of the class described, a beverage dispensing faucet, a dual conduit line constituting a draft line connection from a source of chilled beverage to the dispensing faucet therefor, and a portion of a refrigerant line in thermal exchange relation thereto, a refrigerant system including a source, a thermal expansion valve, and a cooling element adjacent the dispensing faucet, said portion of the refrigerant line including a thin wall metal tubing and the coextensive portion of the draft line surrounding the said metal tubing section and formed in major part, of Koroseal, said coextensive portions extending from the regions of the beverage source, and the expansion valve, to the region of the dispensing faucet.

LOUIS WEISS.